(12) United States Patent
Katou

(10) Patent No.: US 7,574,228 B2
(45) Date of Patent: Aug. 11, 2009

(54) MULTI-SPOT CALL SYSTEM, SOUND VOLUME ADJUSTMENT DEVICE, PORTABLE TERMINAL DEVICE, AND SOUND VOLUME ADJUSTMENT METHOD USED THEREFOR AND PROGRAM THEREOF

(75) Inventor: Shigeki Katou, Tokyo (JP)

(73) Assignee: NEC Corporation (JP)

( * ) Notice: Subject to any disclaimer, the term of this patent is extended or adjusted under 35 U.S.C. 154(b) by 763 days.

(21) Appl. No.: 11/266,724

(22) Filed: Nov. 3, 2005

(65) Prior Publication Data

US 2006/0098591 A1    May 11, 2006

(30) Foreign Application Priority Data

Nov. 10, 2004 (JP) .............................. 2004-325782

(51) Int. Cl.
H04Q 7/20 (2006.01)
(52) U.S. Cl. ...................... 455/518; 455/519; 455/517; 455/500; 455/416; 455/403; 379/202.01; 379/203.01; 379/204.01; 379/205.01; 379/206.01
(58) Field of Classification Search ................ 455/518, 455/519, 517, 501, 500, 416, 403, 414.1–414.4, 455/418–420, 466, 508–514, 412.1, 412.2, 455/90.2, 571.1; 379/202.1, 203.01, 204.01, 379/205.01, 206.1
See application file for complete search history.

(56) References Cited

U.S. PATENT DOCUMENTS

| 5,533,112 | A | 7/1996 | Danneels |
| 5,889,764 | A | 3/1999 | Needham et al. |
| 2005/0239486 | A1* | 10/2005 | D'Avello et al. ............ 455/519 |
| 2006/0055771 | A1* | 3/2006 | Kies ....................... 348/14.03 |
| 2006/0089180 | A1* | 4/2006 | Salmi ...................... 455/575.1 |

(Continued)

FOREIGN PATENT DOCUMENTS

CN          1111775 A     11/1995

(Continued)

OTHER PUBLICATIONS

Search Report issued by European Patent Office on Mar. 6, 2006 in connection with corresponding European patent application No. EP 05 02 4174.

(Continued)

*Primary Examiner*—Keith T Ferguson
(74) *Attorney, Agent, or Firm*—Ostrolenk, Faber, LLP

(57) ABSTRACT

Stored in an each speaker's sound volume coefficient table 13 are a speaker identification ID and information of a voice coefficient so as to be correlated with each other. A speaker identification unit 11 extracts an each speaker's ID from a received packet based on floor control information or outputs the packet as an RTP packet to an RTP buffer. A sound volume control unit 12 executes a control program 14a of a recording medium 14 to record a current speaker identification ID and reads a sound volume coefficient relevant to the speaker identification ID from the each speaker's sound volume coefficient table 13 to output the coefficient as sound volume control information. In this case, the sound volume control unit 12 increments/decrements the relevant sound volume coefficient based on sound volume adjustment information of a sound volume adjustment unit.

19 Claims, 6 Drawing Sheets

U.S. PATENT DOCUMENTS

2007/0127670 A1* 6/2007 Morishima et al. ..... 379/202.01

FOREIGN PATENT DOCUMENTS

| | | |
|---|---|---|
| EP | 0 659 006 A2 | 11/1994 |
| JP | 09-149133 | 6/1997 |
| JP | 2000-312247 | 11/2000 |
| JP | 2001-094604 | 4/2001 |
| WO | WO 00/72560 A1 | 11/2000 |

OTHER PUBLICATIONS

*Push-to-Talk Over Cellular (PoC)*, Ericsson, et. al., *Architecture, PoC Release V1.1.0* (Aug. 2003) pp. 1-23, XP-000863835.

"Push-to-Talk over Cellular (PoC); 7.5 Floor Control" (Architecture V1.1.0 (Aug. 2003).

Office Action issued by Chinese Patent Office on Feb. 6, 2009 in connection with corresponding Chinese Patent Application No. 200510120268.X.

Partial English translation of Chinese Office Action issued Feb. 6, 2009 submitted as a statement of relevancy of the prior art against instant application.

* cited by examiner

MULTI-SPOT CALL SYSTEM, SOUND VOLUME ADJUSTMENT DEVICE, PORTABLE TERMINAL DEVICE, AND SOUND VOLUME ADJUSTMENT METHOD USED THEREFOR AND PROGRAM THEREOF

BACKGROUNDS OF THE INVENTION

1. Field of the Invention

The present invention relates to a multi-spot call system, a sound volume adjustment device, a portable terminal device, and a sound volume adjustment method used therefor and a program thereof, and more particularly, to a sound volume adjustment method on a reception side in a multi-spot call system such as an inter-multi-spot conference device.

2. Description of the Related Art

In conventional terminal devices used in multi-spot call systems of this kind, even if a transmission terminal is changed to have the sound volume heavily varying with one who speaks, because of lack of an effective means for adjusting the volume appropriately, each end user needs to speak carefully.

Under these circumstances, proposed for conventional multi-spot call systems is a method, in a telephone set used by a plurality of persons mainly for domestic use, of extracting/identifying one who speaks and using information (sound volume information and speech speed information) set in advance at a table relevant to the speaker to change properties such as the sound volume and a speech speed of the telephone set (see e.g. Japanese Patent Laying-Open (Kokai) No. 2000-312247). With this method, such operation is not required of increasing the sound volume every time the old who are hard to hear a little sound and not good at minute operation answer the telephone.

Also proposed for conventional multi-spot call systems is a method of storing pre-set amplitude/attenuation rate of a voice signal in a voice management information storage means so as to be correlated with a calling party to adjust the sound volume at an information terminal such as a PC (personal computer). The method is characterized in that voice management information is set in advance in some manner or other and is exchanged between information terminals through a network (see e.g. Japanese Patent Laying-Open (Kokai) No. 2001-094604).

Conventional multi-spot call systems are further characterized in that in a voice input terminal connected to a multi-spot TV conference system, a voice adjustment means is provided at an input side to adjust a difference between appropriate sound volume of the other party's terminal which is set in advance and input sound volume of its own terminal and output the appropriate sound volume to a network (see e.g. Japanese Patent Laying-Open (Kokai) No. 09-149133).

With the above-described conventional multi-spot communication systems, however, in a case of using the technique disclosed in the above-described Patent Article 1, when a plurality of persons make a call simultaneously at multiple spots, it is impossible to make dynamic adjustment of the sound volume according to the volume of the other party's voice, surrounding noise and the like to hear with the constant sound volume.

In addition, with the conventional multi-spot communication systems, however, in a case of using the technique disclosed in the above-described Patent Article 2, when a plurality of persons make a call simultaneously at multiple spots similarly to the above-described case, it is impossible to make dynamic adjustment of the sound volume according to the volume of the other party's voice, surrounding noise and the like to hear with the constant sound volume.

Furthermore, with the conventional multi-spot communication systems, however, in a case of using the technique disclosed in the above-described Patent Article 3, while the technique is effective for a terminal of a TV conference system disposed fixedly at a specific position to be used under constant environments, it is impossible to make dynamic adjustment of the sound volume according to the volume of the other party's voice, surrounding noise and the like to hear with the constant sound volume.

SUMMARY OF THE INVENTION

An object of the present invention is to provide a multi-spot call system, a sound volume adjustment device, a portable terminal device, and a sound volume adjustment method used therefor and a program thereof which solve the above-described problems and enable dynamic sound volume adjustment to make hearing with the constant sound volume possible.

The multi-spot call system of the present invention provides a structure of a means for storing information about a transmission source of a voice packet received and information about a transmission source by the operation by an end user to adjust the volume of voice in a sound volume adjustment device.

More specifically, the multi-spot call system of the present invention is characterized in that the sound volume adjustment device includes a speaker identification means which takes out floor control information for controlling a speaker's right to extract an ID for each speaker (identification information) from a received packet based on the information, an output means which records a current speaker identification ID to output a relevant sound volume coefficient as sound volume control information, a means which increments/decrements a relevant sound volume coefficient based on sound volume button pressing information, and a means which stores speaker identification ID and information of a voice coefficient.

Here, floor control information, which is used for controlling a speaker's right in a PoC (Push-to-Talk over Cellular) system, serves for notifying, from a PoC server, each portable terminal of information about which terminal has a speaker's right.

The multi-spot call system of the present invention also provides an end user with an intuitive means capable of adjusting, when the system is used at a scene where a voice packet is sent from a plurality of transmission destinations, the sound volume of each voice packet for each transmission destination according to operation of sound volume adjustment by an end user to make the end user have the constant sound volume.

This arrangement enables the multi-spot call system of the present invention to dynamically adjust the sound volume at the sound volume adjustment device, thereby allowing an end user to hear with the constant sound volume.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
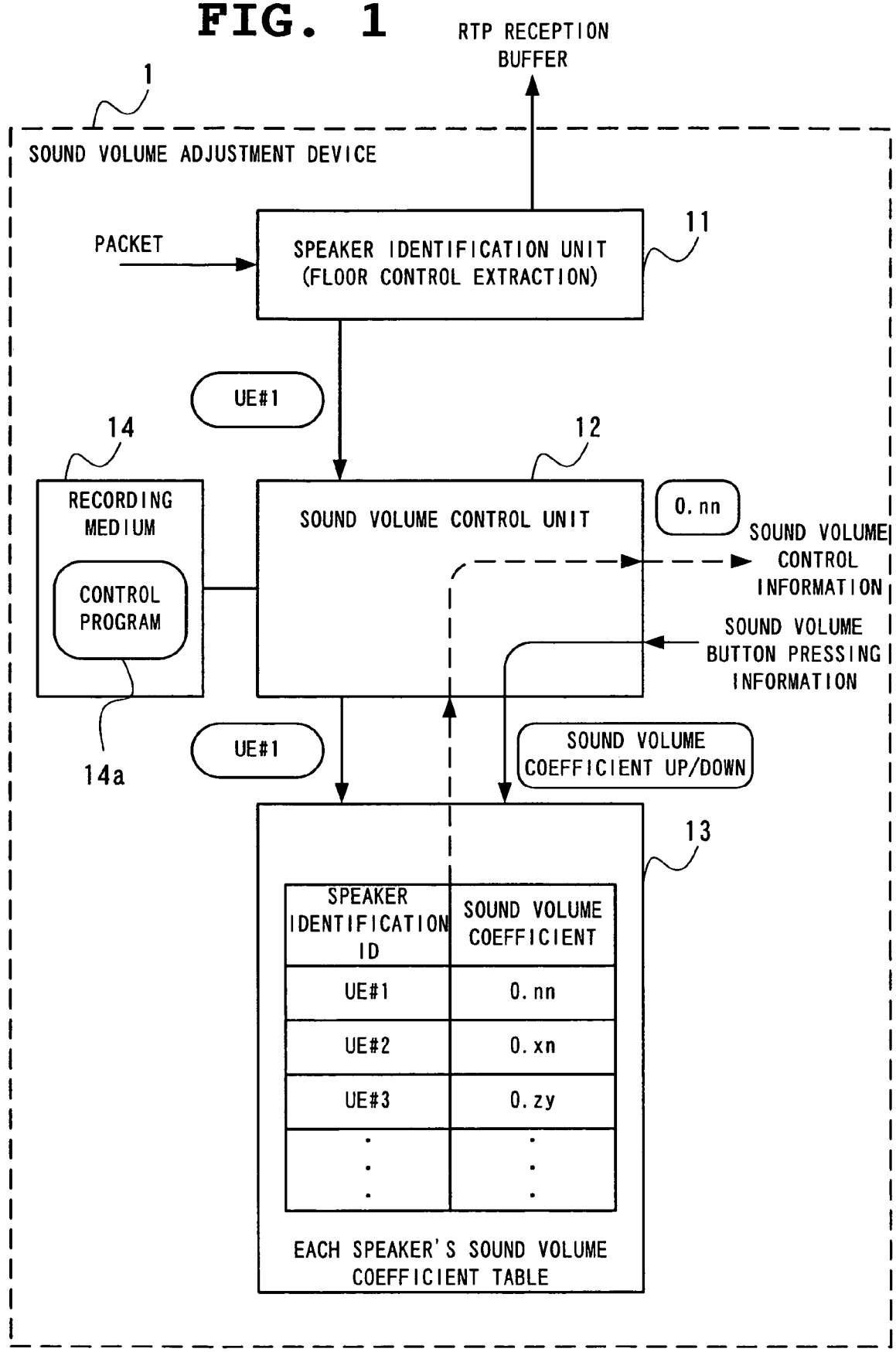
FIG. 1 is a block diagram showing a structure of a sound volume adjustment device according to one embodiment of the present invention.

FIG. 1 is a block diagram showing a structure of a sound volume adjustment device according to one embodiment of the present invention.

In FIG. 1, a sound volume adjustment device 1 includes a speaker identification unit 11, a sound volume control unit 12, an each speaker's sound volume coefficient table 13, and a recording medium 14 which holds a control program 14a executed by the sound volume control unit 12.

The speaker identification unit 11 takes out floor control information for controlling a speaker's right from a received packet to extract an ID for each speaker based on the information.

The sound volume control unit 12 executes the control program 14a of the recording medium 14 to record a current speaker identification ID and output a sound volume coefficient relevant to the speaker identification ID as sound volume control information. In this case, the sound volume control unit 12 increments or decrements the relevant sound volume coefficient to output the obtained coefficient based on the contents of sound volume adjustment such as pressing of a sound volume button (not shown) as a sound volume adjustment means and operation of a sound volume dial (not shown).

Here, the floor control information is information for use in controlling a speaker's right in a PoC (Push-to-Talk over Cellular) system, which serves to notify each portable terminal of information about which terminal has a speaker's right from a PoC server [see "Push-to-Talk over Cellular (PoC); 7.5 Floor Control" (Architecture V1.1.0 (2003-08))].

The each speaker's sound volume coefficient table 13 stores a speaker identification ID (UE#1, UE#2, UE#3, ...) for unitarily identifying a speaker and information of a voice coefficient (0.nn, 0.xn, 0.zy) so as to be correlated with each other.

Figure 2:
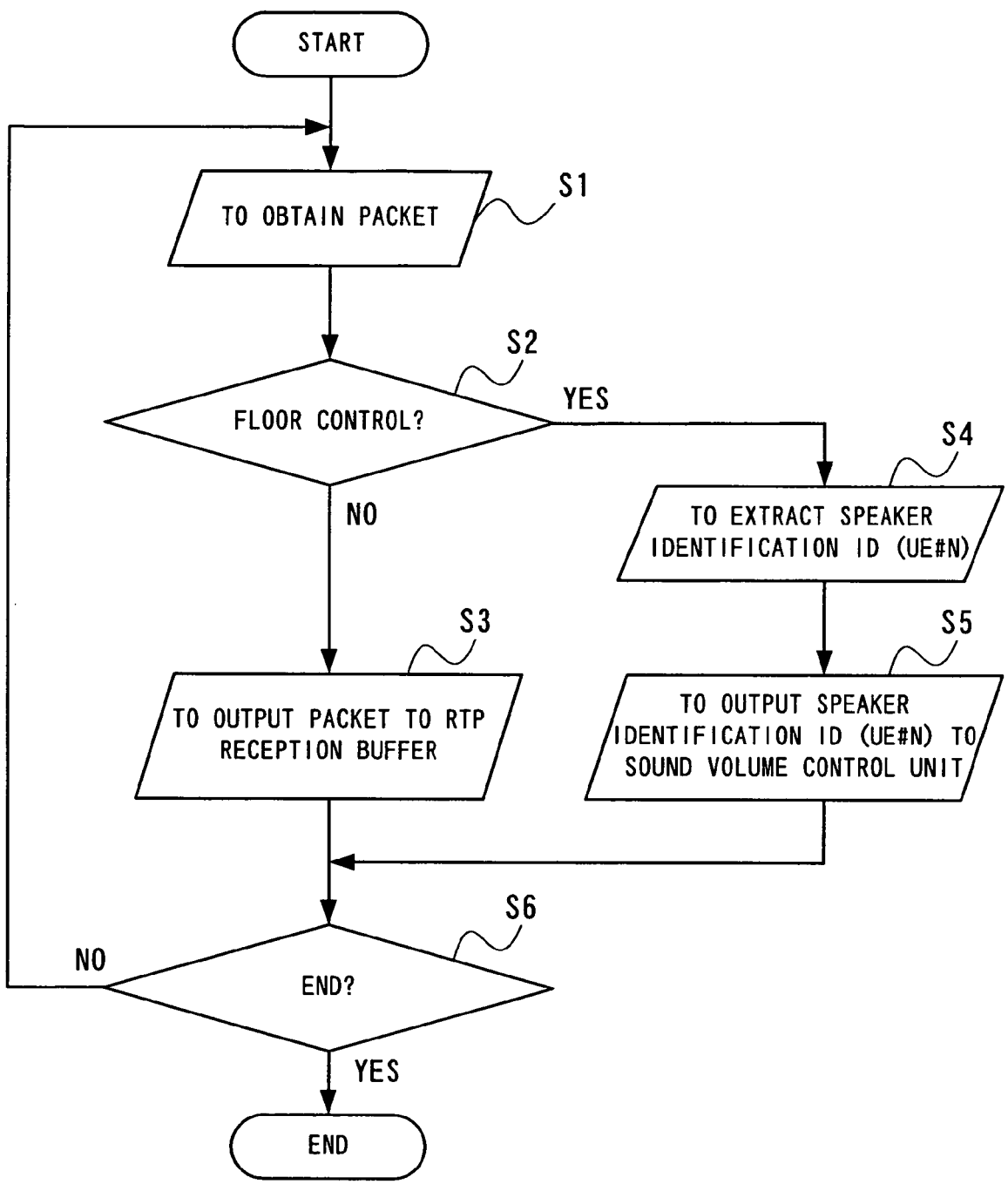
FIG. 2 is a flow chart showing operation of a speaker identification unit shown in FIG. 1.
Figure 3:
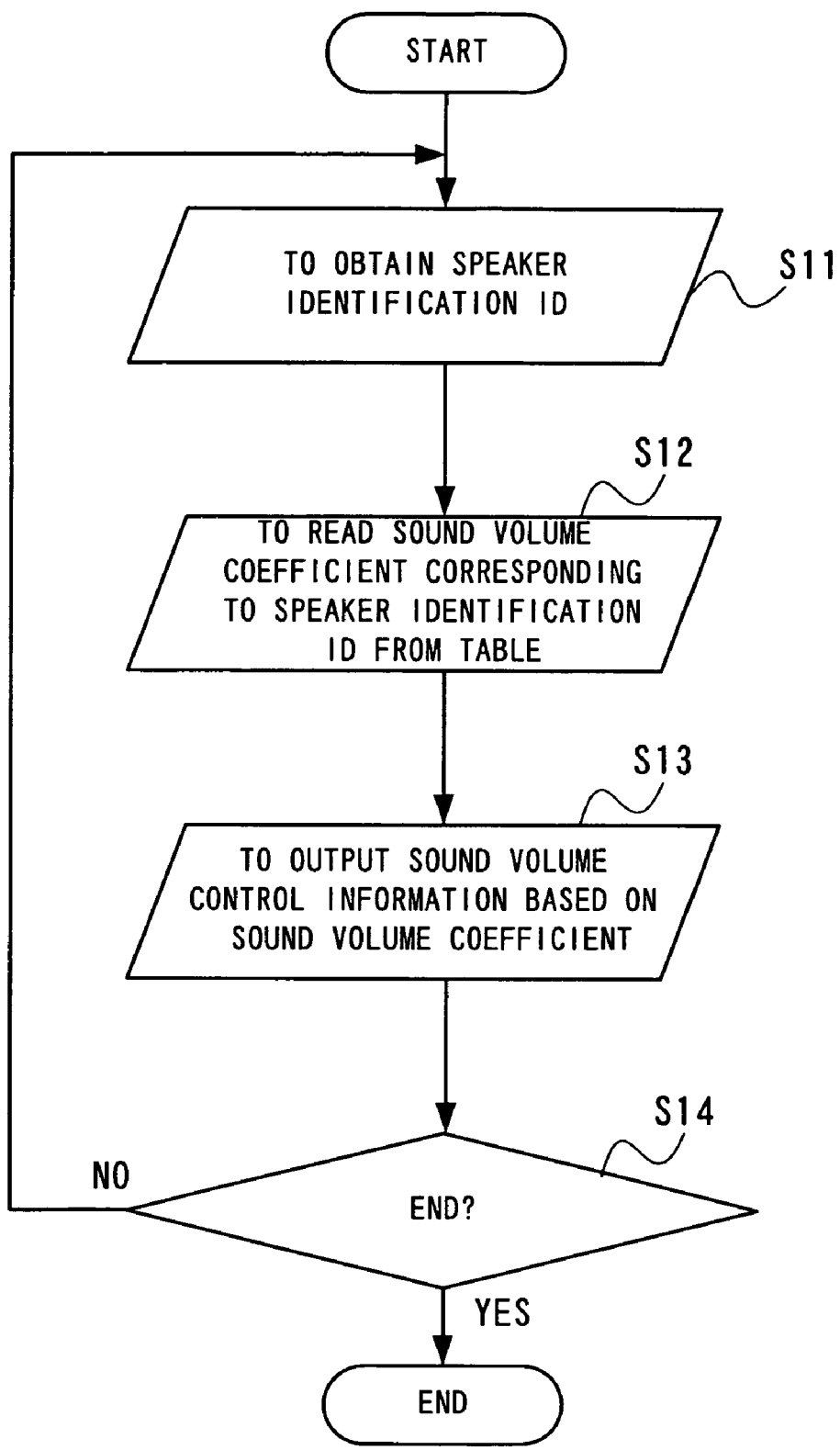
FIG. 3 is a flow chart showing operation of a sound volume control unit shown in FIG. 1.
Figure 4:
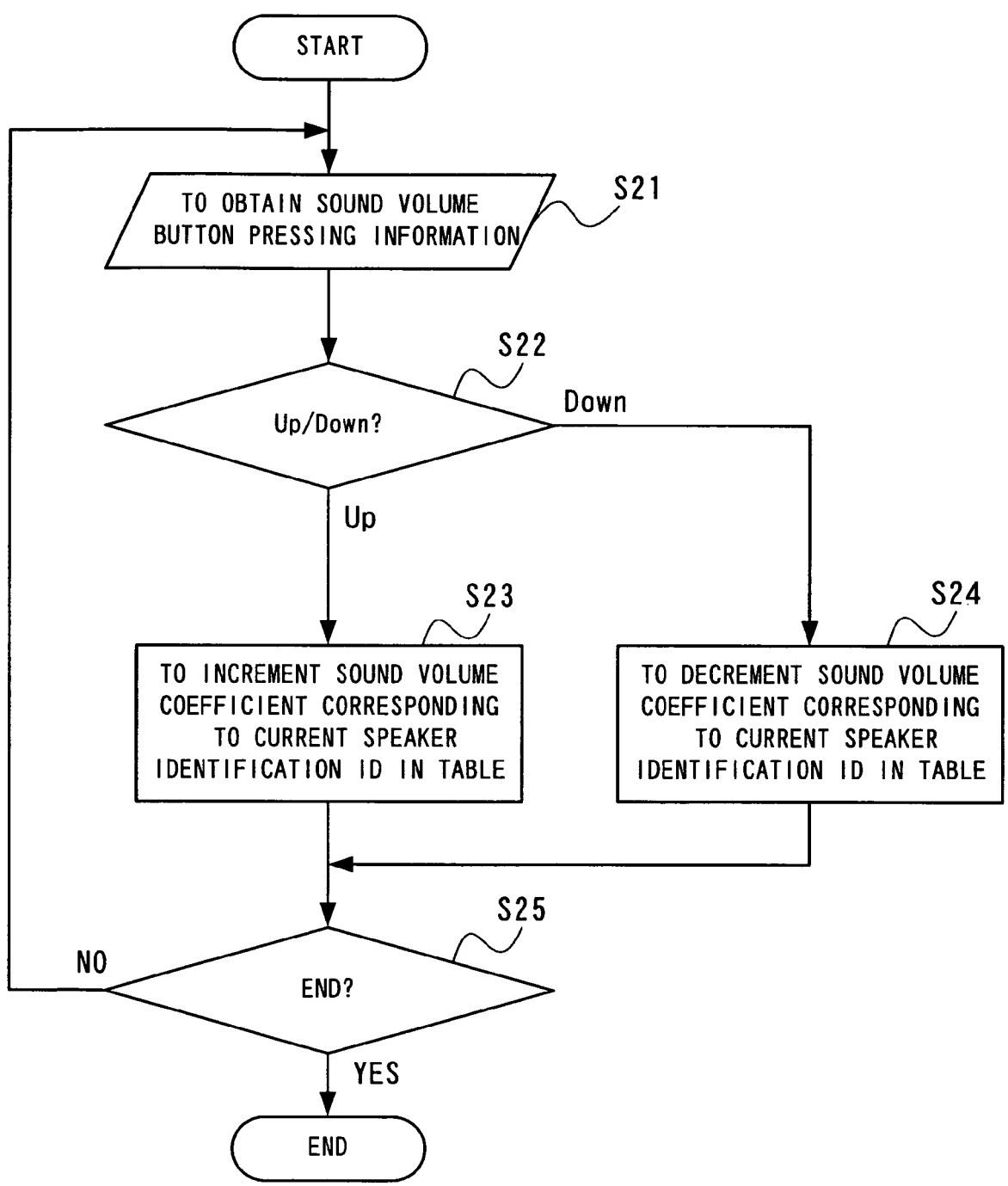
FIG. 4 is a flow chart showing operation of the sound volume control unit shown in FIG. 1.

FIG. 2 is a flow chart showing operation of the speaker identification unit 11 illustrated in FIG. 1, and FIG. 3 and FIG. 4 are flow charts showing operation of the sound volume control unit 12 illustrated in FIG. 1. With reference to FIG. 1 to FIG. 4, description will be made of operation of the sound volume adjustment device 1 according to one embodiment of the present invention. The processing shown in FIG. 3 and FIG. 4 is realized by executing the control program 14a of the recording medium 14 by the sound volume control unit 12.

After starting the processing, the speaker identification unit 11 obtains a packet (Step S1 in FIG. 2) to determine whether the obtained packet is floor control information or not (Step S2 in FIG. 2).

When the packet is floor control information, the speaker identification unit 11 extracts a speaker identification ID based on the floor control information (Step S4 in FIG. 2) to output the extracted speaker identification ID to the sound volume control unit 12 (Step S5 in FIG. 2). When the packet is not floor control information, the speaker identification unit 11 outputs the packet to an RTP (Real-time Transport Protocol) reception buffer (not shown).

The speaker identification unit 11 determines whether the above-described processing is to be completed or not (Step S6 in FIG. 2) and when the processing is completed, finishes the above-described processing.

Next, when starting the processing, the sound volume control unit 12 obtains the speaker identification ID (Step S11 in FIG. 3) and obtains a voice coefficient corresponding to the speaker identification ID from the each speaker's sound volume coefficient table 13 (Step S12 in FIG. 3) to output voice control information based on the obtained voice coefficient (Step S13 in FIG. 3). Thereafter, the sound volume control unit 12 determines whether the processing ends or not (Step S14 in FIG. 3) and when the processing ends, finishes the above-described processing.

In addition, when starting the processing, the sound volume control unit 12 obtains sound volume button pressing information (or information about operation of a sound volume dial) (Step S21 in FIG. 4) to determine the contents of sound volume adjustment (UP/DOWN) from the sound volume button pressing information (or information about operation of the sound volume dial) (Step S22 in FIG. 4).

When the contents of the sound volume adjustment by the sound volume button is UP, the sound volume control unit 12 increments a sound volume coefficient corresponding to a current speaker identification ID at the each speaker's sound volume coefficient table 13 (Step S23 in FIG. 4).

Furthermore, when determining that the contents of the sound volume adjustment by the sound volume button is Down, the sound volume control unit 12 decrements a sound volume coefficient corresponding to a current speaker identification ID at the each speaker's sound volume coefficient table 13 (Step S24 in FIG. 4).

The sound volume control unit 12 determines whether the processing ends or not (Step S25 in FIG. 4) and when the processing ends, finishes the above-described processing.

Thus, according to the sound volume adjustment device 1 of the present embodiment, the speaker identification unit 11 extracts an ID for each speaker from a received packet based on floor control information and the sound volume control unit 12 records a current speaker identification ID and reads a relevant sound volume coefficient from the each speaker's sound volume coefficient table 13 to output the coefficient as sound volume control information, as well as incrementing/decrementing the relevant sound volume coefficient based on the contents of sound volume adjustment (pressing information) by a sound volume adjustment means such as a sound volume button to dynamically adjust the sound volume, thereby enabling an end user to hear with the constant sound volume.

In addition, the present embodiment provides an end user with an intuitive means capable of adjusting the sound volume of each voice packet sent from a plurality of transmission destinations, when the system is used at a scene where a voice packet is sent from a plurality of transmission destinations, for each transmission destination according to operation of sound volume adjustment by an end user to make the end user hear with the constant sound volume.

As a result, the multi-spot call system of the present invention is allowed to dynamically adjust the sound volume at the sound volume adjustment device, thereby enabling the ender user to hear with the constant sound volume.

Figure 5:
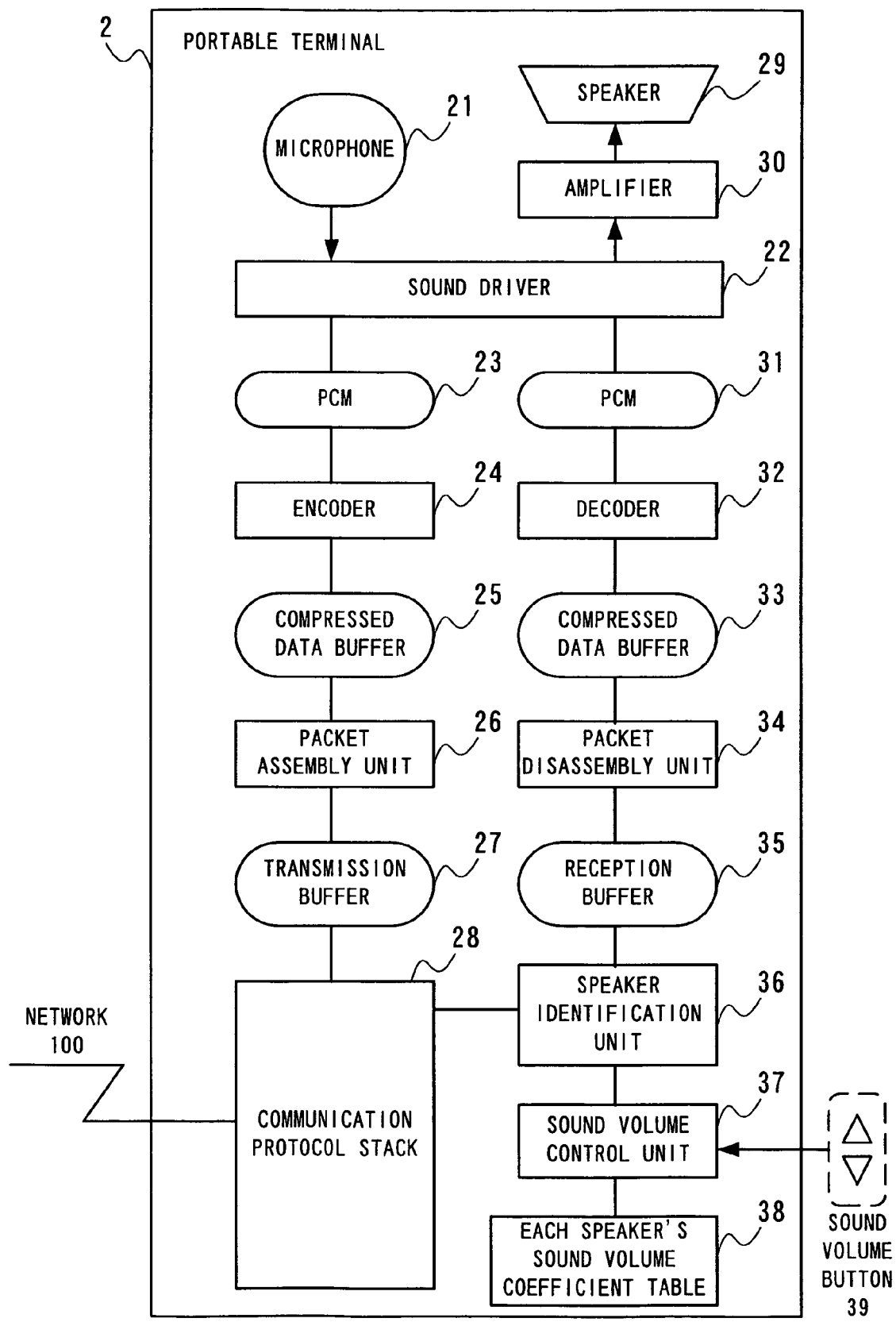
FIG. 5 is a block diagram showing a structure of a portable terminal including the sound volume adjustment device according to one embodiment of the present invention.
Figure 6:
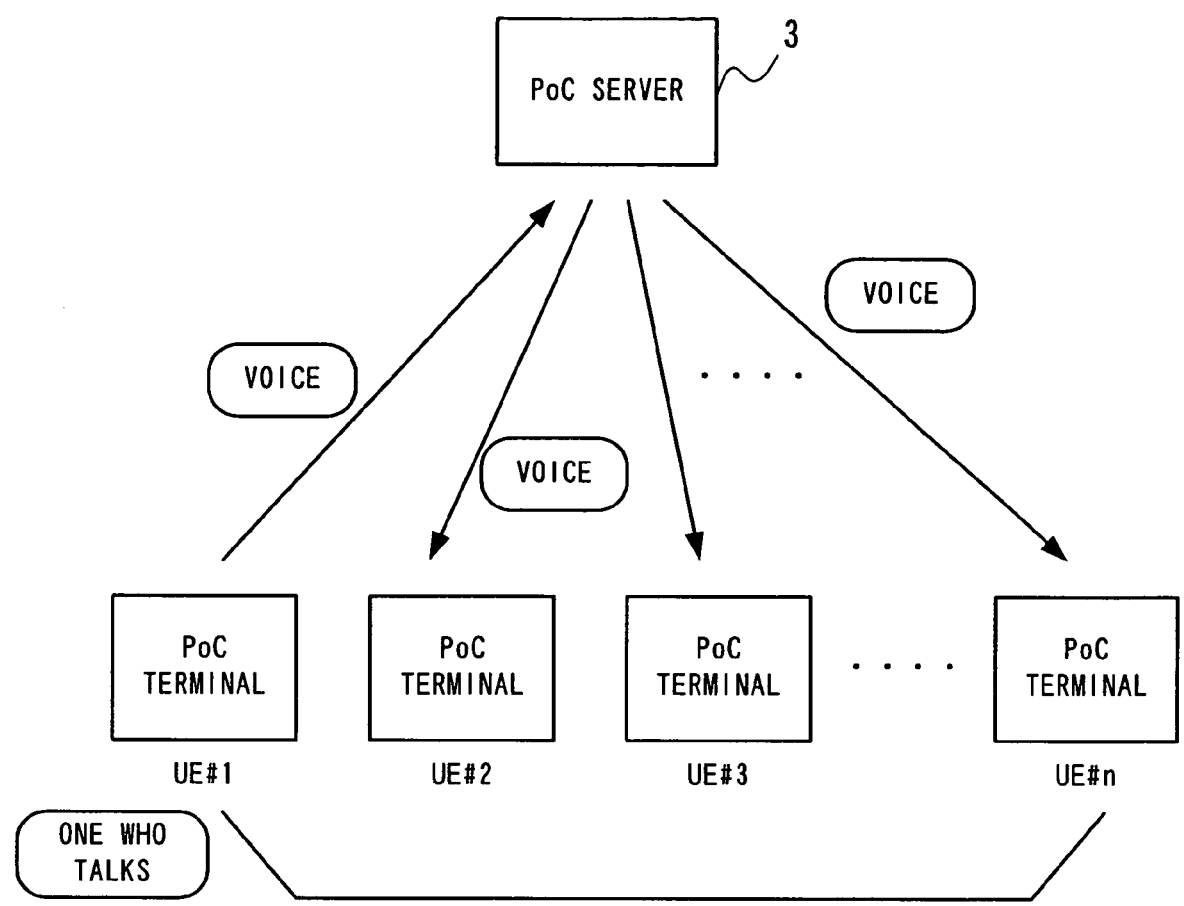
FIG. 6 is a block diagram showing a structure of a multi-spot call system according to one embodiment of the present invention.

FIG. 5 is a block diagram showing a structure of a portable terminal including a sound volume adjustment device according to one embodiment of the present invention and FIG. 6 is a block diagram showing a structure of a multi-spot call system according to one embodiment of the present invention. The multi-spot call system according to one embodiment of the present invention shown in FIG. 6 is a PoC (Push-to-Talk over Cellular) system.

In FIG. 5, a portable terminal 2 includes a microphone 21, a sound driver 22, PCM (Pulse Code Modulation) 23 and 31, an encoder 24, compressed data buffers 25 and 33, a packet assembly unit 26, a transmission buffer 27, a communication protocol stack 28, a speaker 29, an amplifier 30, a decoder 32, a packet disassembly unit 34, a reception buffer 35, a speaker identification unit 36, a sound volume control unit 37, an each speaker's sound volume coefficient table 38 and a sound volume button 39.

In the portable terminal 2, the speaker identification unit 36, the sound volume control unit 37 and the each speaker's sound volume coefficient table 38 have the same structures as those of the above-described speaker identification unit 11, sound volume control unit 12 and each speaker's sound volume coefficient table 13 to execute the same operation as in the sound volume adjustment device 1 according to one embodiment of the present invention.

Voice obtained by the microphone 21 is converted into PCM data by the sound driver 22, compressed by a CODEC (coder/decoder) designated in advance and stored in the compressed data buffer 25.

The compressed data is assembled into a packet by the packet assembly unit 26 and output to a network 100 [a PoC server 3 in FIG. 6] through the transmission buffer 27 and the communication protocol stack 28.

A packet from the PoC server 3 shown in FIG. 6 is applied through the communication protocol stack 28 from the network 100 and subjected to speaker identification processing at the speaker identification unit 36 or transferred to the reception buffer 35 as an RTP packet.

The RTP packet transferred to the reception buffer 35 is disassembled by the packet disassembly unit 34 and stored in the compressed data buffer 33. The data stored in the compressed data buffer 33 is returned to PCM data at the decoder 32 and output as voice from the speaker 29 through the sound driver 22 and the amplifier 30.

At this time, the sound volume control unit 37 reads a sound volume coefficient according to a current speaker from the each speaker's sound volume coefficient table 13 based on a speaker identification ID extracted by the speaker identification unit 36 and applies the sound volume coefficient to the decoder 32 as control information to control increment/decrement of the sound volume when returning the data to the PCM data. In addition, when the end user adjusts the sound volume by the sound volume button 39, the sound volume control unit 37 increments/decrements a sound volume coefficient of the each speaker's sound volume coefficient table 38 based on the adjustment contents (the contents of sound volume adjustment by the sound volume adjustment means).

Here, the PoC system shown in FIG. 6 allows one person to make a call with multiple persons by using a packet network. Two or more persons, however, are not allowed to talk with each other simultaneously and therefore one who wants to talk waits for a person currently talking to end and starts talking after obtaining a speaker's right.

Manner of using the PoC terminal (UE#1~UE#n) is similar to a manner of using a so-called transceiver.

A speaker presses a dedicated PoC key to enter a continuation state and obtain a speaker's right, so that data of voice generated is sent to other PoC terminal. In this case, other PoC terminal is not allowed to generate voice and is only allowed to receive voice.

By releasing the dedicated PoC key by one who holds a speaker's right, the speaker's right is released and after the release, a PoC terminal whose dedicated PoC key is pressed first obtains a speaker's right to be able to talk through the PoC terminal.

Having the structure and operation as described in the foregoing, the present invention achieves the effect of enabling dynamic sound volume adjustment to allow a person to hear with the constant sound volume.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A multi-spot call system using a PoC (Push-to-Talk over Cellular) which executes voice transmission, between a plurality of portable terminal devices, from a portable terminal device having a speaker's right to other portable terminal device, wherein
   at least one of said portable terminal devices includes
   an identification unit which identifies a portable terminal device having said speaker's right based on floor control information for controlling said speaker's right, and
   an adjustment unit which adjusts the sound volume from its own terminal based on sound volume control information set for each portable terminal device having said speaker's right which is identified by said identification unit.

2. The multi-spot call system according to claim 1, wherein
   at least one of said portable terminal devices includes
   a storage management unit which stores and manages the sound volume control information set for each speaker of said portable terminal device so as to correspond to each said portable terminal device, and wherein
   said adjustment unit searches said storage management unit for said sound volume control information corresponding to a portable terminal device having said speaker's right which is identified by said identification unit.

3. The multi-spot call system according to claim 2, wherein
said identification unit extracts each speaker's identification information which identifies said portable terminal device from said floor control information,
said storage management unit stores said each speaker's identification information and sound volume control information relevant to the each speaker's identification information so as to correspond to each other, and
said adjustment unit outputs said sound volume control information corresponding to said each speaker's identification information.

4. The multi-spot call system according to claim 2, wherein
said adjustment unit increments and decrements relevant sound volume control information based on the contents of adjustment by the sound volume adjustment unit for use in the operation of said sound volume adjustment.

5. In a multi-spot call system using a PoC (Push-to-Talk over Cellular) which executes voice transmission, between a plurality of portable terminal devices, from a portable terminal device having a speaker's right to other portable terminal device, a sound volume adjustment device which adjusts the sound volume of a voice packet received by said portable terminal device, comprising:
an identification unit which identifies a portable terminal device having said speaker's right based on floor control information for controlling said speaker's right, and
an adjustment unit which adjusts the sound volume from its own terminal based on sound volume control information set for each portable terminal device having said speaker's right which is identified by said identification unit.

6. The sound volume adjustment device according to claim 5, comprising:
a storage management unit which stores and manages the sound volume control information set for each speaker of said portable terminal device so as to correspond to each said portable terminal device, wherein
said adjustment unit searches said storage management unit for said sound volume control information corresponding to a portable terminal device having said speaker's right which is identified by said identification unit.

7. The sound volume adjustment device according to claim 6, wherein
said identification unit extracts each speaker's identification information which identifies said portable terminal device from said floor control information,
said storage management unit stores said each speaker's identification information and sound volume control information relevant to the each speaker's identification information so as to correspond to each other, and
said adjustment unit outputs said sound volume control information corresponding to said each speaker's identification information.

8. The sound volume adjustment device according to claim 6, wherein
said adjustment unit increments and decrements relevant sound volume control information based on the contents of adjustment by the sound volume adjustment unit for use in the operation of said sound volume adjustment.

9. A portable terminal device which outputs voice of a voice packet received in a multi-spot call system using a PoC (Push-to-Talk over Cellular) which executes voice transmission from a portable terminal device having a speaker's right to other portable terminal device, comprising:
an identification unit which identifies a portable terminal device having said speaker's right based on floor control information for controlling said speaker's right, and
an adjustment unit which adjusts the sound volume from its own terminal based on sound volume control information set for each portable terminal device having said speaker's right which is identified by said identification unit.

10. The portable terminal device according to claim 9, comprising:
a storage management unit which stores and manages the sound volume control information set for each speaker of said portable terminal device so as to correspond to each said portable terminal device, wherein
said adjustment unit searches said storage management unit for said sound volume control information corresponding to a portable terminal device having said speaker's right which is identified by said identification unit.

11. The portable terminal device according to claim 10, wherein
said identification unit extracts each speaker's identification information which identifies said portable terminal device from said floor control information,
said storage management unit stores said each speaker's identification information and sound volume control information relevant to the each speaker's identification information so as to correspond to each other, and
said adjustment unit outputs said sound volume control information corresponding to said each speaker's identification information.

12. The portable terminal device according to claim 10, wherein
said adjustment unit increments and decrements relevant sound volume control information based on the contents of adjustment by the sound volume adjustment unit for use in the operation of said sound volume adjustment.

13. A sound volume adjustment method for use in a multi-spot call system using a PoC (Push-to-Talk over Cellular) which executes voice transmission, between a plurality of portable terminal devices, from a portable terminal device having a speaker's right to other portable terminal device, comprising the steps, executed at at least one of said portable terminal devices, of:
identifying a portable terminal device having said speaker's right based on floor control information for controlling said speaker's right, and
adjusting the sound volume from its own terminal based on sound volume control information set for each portable terminal device having said speaker's right which is identified.

14. The sound volume adjustment method according to claim 13, comprising the steps of:
storing and managing the sound volume control information set for each speaker of said portable terminal device in a storage unit so as to correspond to each said portable terminal device, wherein
at said adjustment step, said sound volume control information corresponding to a portable terminal device having said speaker's right which is identified by said identification unit is searched from said storage unit.

15. The sound volume adjustment method according to claim 14, wherein
at said identification step, each speaker's identification information which identifies said portable terminal device is extracted from said floor control information, at said storing and managing step, said each speaker's identification information and sound volume control information relevant to the each speaker's identification information are stored so as to correspond to each other, and at said adjustment step, said sound volume control information corresponding to said each speaker's identification information is output.

16. The sound volume adjustment method according to claim 14, wherein at said adjustment step, relevant sound volume control information is incremented and decremented based on the contents of adjustment by a sound volume adjustment unit for use in the operation of said sound volume adjustment.

17. A sound volume adjustment program executed by a sound volume control unit for use in a multi-spot call system using a PoC (Push-to-Talk over Cellular) which executes voice transmission, between a plurality of portable terminal devices, from a portable terminal device having a speaker's right to other portable terminal device, wherein makes a computer of at least one of said portable terminal devices execute the functions of:

identifying a portable terminal device having said speaker's right based on floor control information for controlling said speaker's right, and adjusting the sound volume from its own terminal based on sound volume control information set for each portable terminal device having said speaker's right which is identified.

18. The sound volume adjustment program according to claim 17, further comprising the functions of:

processing of storing and managing the sound volume control information set for each speaker of said portable terminal device in a storage unit so as to correspond to each said portable terminal device, wherein with said adjustment function, said sound volume control information corresponding to a portable terminal device having said speaker's right which is identified by said identification unit is searched from said storage unit.

19. The sound volume adjustment program according to claim 18, wherein with said adjustment function, relevant sound volume control information is incremented and decremented based on the contents of adjustment by a sound volume adjustment unit for use in the operation of said sound volume adjustment.

* * * * *

UNITED STATES PATENT AND TRADEMARK OFFICE
CERTIFICATE OF CORRECTION

| | |
|---|---|
| PATENT NO. | : 7,574,228 B2 |
| APPLICATION NO. | : 11/266724 |
| DATED | : August 11, 2009 |
| INVENTOR(S) | : Shigeki Katou |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Fourteenth Day of December, 2010

David J. Kappos
*Director of the United States Patent and Trademark Office*